June 12, 1956 A. N. MILSTER 2,750,462
UNIVERSAL ACCELERATOR AND PEDAL SWITCH
Filed Dec. 18, 1952 2 Sheets-Sheet 1
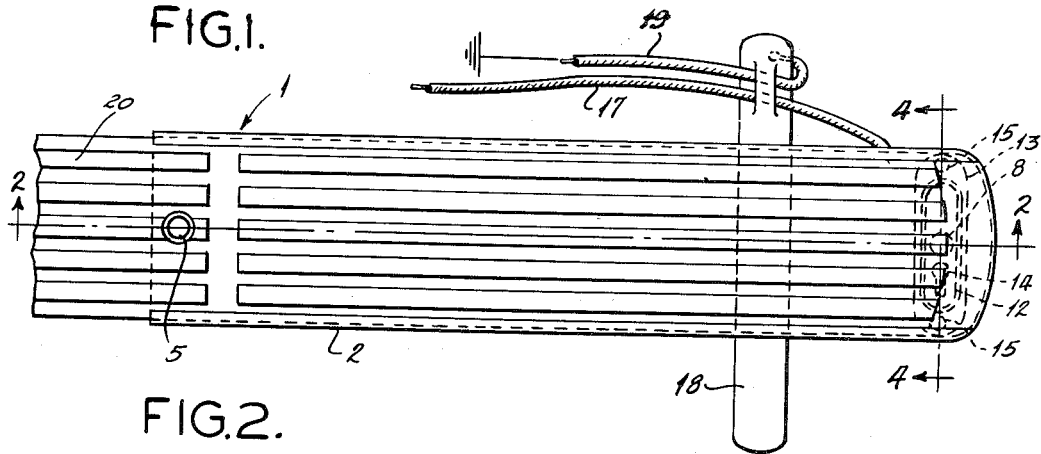
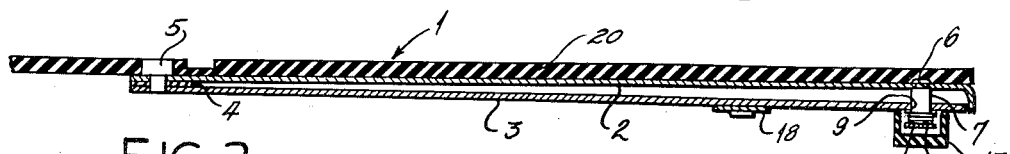
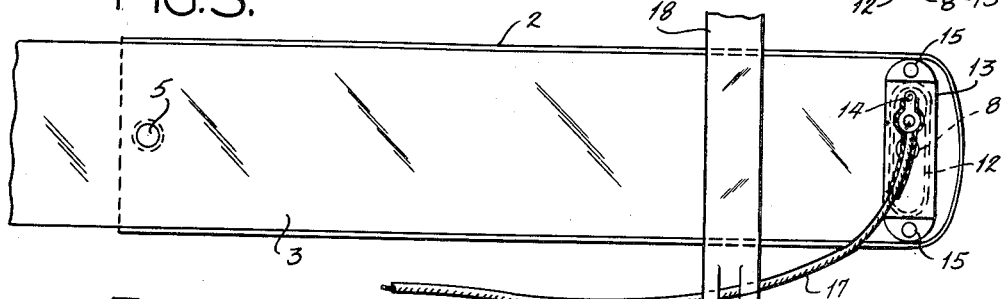
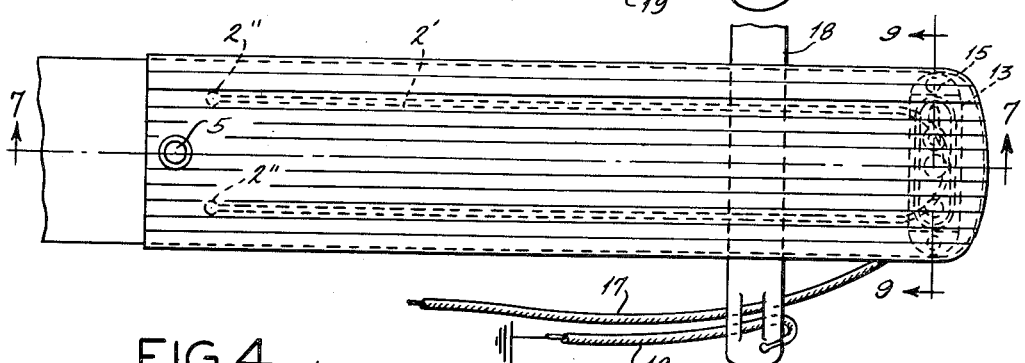
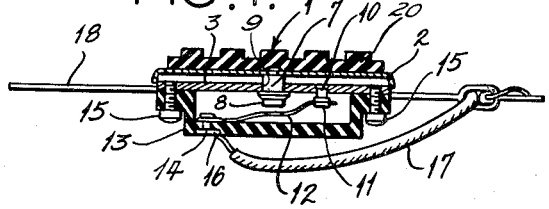
INVENTOR:
ARTHUR N. MILSTER
By Gravely, Lieder, Woodruff & Dees
ATTORNEYS.

June 12, 1956  A. N. MILSTER  2,750,462
UNIVERSAL ACCELERATOR AND PEDAL SWITCH
Filed Dec. 18, 1952  2 Sheets-Sheet 2
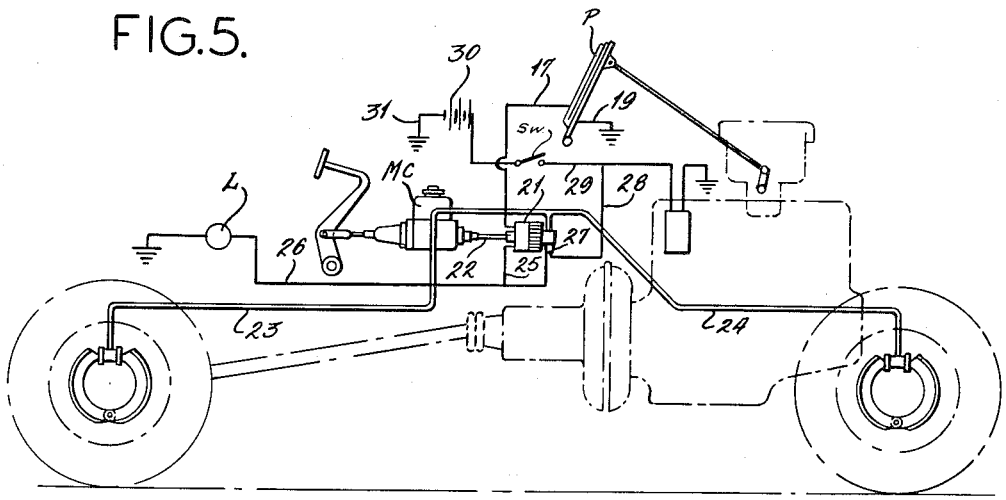
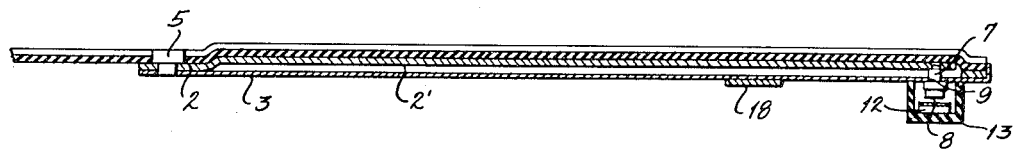
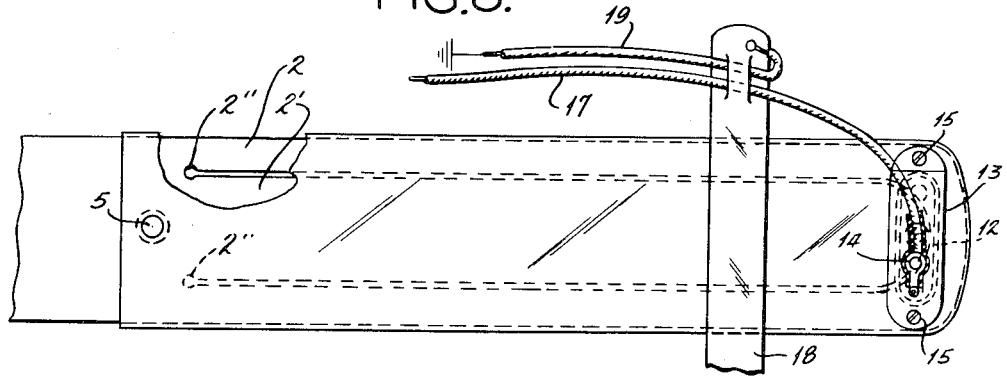
INVENTOR:
ARTHUR N. MILSTER
By Gravely, Lieder, Woodruff & Dees
ATTORNEYS.

United States Patent Office 2,750,462
Patented June 12, 1956

2,750,462

UNIVERSAL ACCELERATOR AND PEDAL SWITCH

Arthur N. Milster, Richmond Heights, Mo., assignor to Wagner Electric Corporation, St. Louis, Mo., a corporation of Delaware Application December 18, 1952, Serial No. 326,736

7 Claims. (Cl. 200—61.89)

This invention relates to switches for automotive devices and is more particularly directed to a switch applicable to an accelerator pedal for the control of brake operating devices.

Automatic transmissions generally have eliminated the use of a clutch pedal in most instances and the necessity of providing some form of brake control for the automobile has been required to prevent or control movement of the vehicle during periods of engine idling. This requirement has introduced other problems that involve the design of switches for controlling the electrically operated brake control mechanisms.

The most satisfactory arrangement for this is a switch that preferably is universal in character and therefore employable on most any type of vehicle but by reason of the difference in individual vehicle designs the problem has required more than ordinary attention. The effective solution of this particular problem is one with which the instant invention is concerned.

The primary object of the invention is to provide a manually operated universal switch assembly for use in circuits for electrically controlled brake mechanisms whose function is to control movement of the motor vehicle.

Another object of the invention is to provide a universal and easily constructed accelerator pedal switch that can be easily adapted and fitted to any type of vehicle and which is relatively simple in design and inexpensive to manufacture.

The invention consists in the provision of a plate adapted to cooperate with an accelerator pedal and on which a switch is mounted having a tongue associated therewith that actuates the switch contacts for the anticreep control circuit and which is covered by a resilient material for insulating and slip preventing purposes.

In the drawings:

Fig. 1 is a plan view of a structure embodying the invention,

Fig. 2 is a sectional view taken substantially along the line 2—2 of Fig. 1,

Fig. 3 is a bottom plan view of the switch assembly,

Fig. 4 is a sectional view taken substantially along the line 4—4 of Fig. 1,

Fig. 5 is a schematic diagram of the electrical circuit for a typical brake holding device including a switch constructed in accordance with the teachings of the present invention, Fig. 6 is a plan view of a modified form of the switch, Fig. 7 is a sectional view taken substantially along the line 7—7 of Fig. 6, Fig. 8 is a bottom plan view of the switch assembly shown in Fig. 6, and Fig. 9 is a sectional view taken substantially along the line 9—9 of Fig. 6.

The universal accelerator pedal switch assembly 1 comprises an upper switch plate 2 and a lower or base plate 3 suitably welded together. The upper switch plate 2 constitutes a tongue which is spaced from the base plate 3 by means of a spacer 4. The plate or tongue 2 may be made of a metal that is resilient and will normally assume a position such as shown in Fig. 2 when there are no external forces applied thereto. The switch plate 2 is further provided with an aperture 5 at its left hand end for receiving a suitable fastening means for attaching the left hand end of the switch assembly to the vehicle accelerator pedal subsequently described.

An aperture 6 is provided in the right hand end of the plate 2 for receiving a stud 7 (Figs. 2 and 4) and having its upper end riveted in order to secure the same to the plate. An insulating button 8 is pressed into a recess (not shown) at the lower end of the stud 7 and an aperture 9 is provided in the right hand end of the lower plate 3 permitting reciprocable movement of the stud 7 and button 8 relative to the lower plate. The lower plate 3 is also provided with contact 10 that is riveted thereto and located adjacent the aperture 9 aligned with the movable contact 11 carried by a resilient switch element 12. The switch element 12 is depressed by the insulating button 8 and is secured to a supporting bracket or bridging member 13 by rivet 14. Fastening means 15 serve to secure the switch case 13 to the lower plate 3. The switch case or bridging member 13 is also provided with a soldering lug 16 secured thereto with the rivet 14 also responsible for securing the switch element 12 to the switch case or bridging member 13. A conductor 17 is connected to the vehicle battery or other suitable source of energy, and is soldered to the lug 16. A clamping band 18 secured to the lower plate 3 by spot welding or other suitable methods serves a two-fold purpose. One of these purposes is to support the conductor 17 and the ground conductor 19 as well as to clamp the right hand end of the switch assembly to the accelerator pedal of the vehicle upon which the assembly is to be mounted. In the latter instance the free ends of the clamping band or member 18 are bent about the accelerator pedal of the vehicle approximately 180° and secure the upper end of the switch assembly to the pedal and the lower end of the switch assembly is secured to the accelerator pedal by a suitable fastening means inserted in the aperture 5. A pedal pad 20 having suitable ridges therein is cemented to the main body of the upper plate 2. The spacer 4 is disposed between the plates 2 and 3 separating the tongue, or plate 2 from the plate 3 thereby maintaining a suitable space relationship and insuring the operator that the stud 7 and its associated parts will normally be in the position indicated in Fig. 4.

Reference is now made to Fig. 5 which shows a typical circuit for a brake control device employing the switch assembly 1 described above. The switch assembly is suitably clamped or otherwise secured to the accelerator pedal of the vehicle wherein the conductor 17 from the switch has its other end connected to the solenoid (not shown) of an electrically operated brake control device 21. The brake control device 21 is connected to a hydraulic master cylinder MC by means of a conduit 22 and conduits 23 and 24 lead to the brake assemblies connected to the output side of the device 21. The opposite end of the solenoid portion of the device 21 has a conductor 26 joining the solenoid with an optional conductor 26 connected to the stop light L for the vehicle. The other end of the conductor 26 is connected to a pressure switch 27 attached to the brake control device 21 wherein the pressure switch 27 serves the dual purpose of controlling the operation of the stop light and also closing the portion of the circuit having the electrically operated brake control device 21 therein. A separate pressure switch may be provided for independently controlling the stop light if so desired. The pressure switch 27 has a conductor 28 connected to the opposite side thereof which is connected to conductor 29 leading from a source of energy such as a battery 30 and the other side of the battery is grounded by means of conductor 31. The conductor 19 is attached to the pedal switch assembly and is also grounded.

The operation of the foregoing circuit and switch assembly depends upon the application of pressure to the switch assembly 1 and assuming that it is installed on a vehicle as described above, the conductor 17 will be connected to the conductor 19 with the accelerator pedal in the position shown in Fig. 4. Therefore, to complete the circuit which includes the foregoing switch assembly it is only necessary to operate the master cylinder by depressing the brake pedal for creating a sufficient pressure within the brake control device 21 so that the pressure switch 27 will be closed. When the circuit is completed between conductors 25 and 28, current will flow from the battery 30 through conductors 29 and 28 to the pressure switch 27 and thence to the solenoid coil (not shown) in the device 21 through the conductor 25. Current will then pass through the coil thence through conductor 17 to the pedal switch assembly 1. From the conductor 17 current passes through the rivet 14 (Fig. 4) and the switch element 12 to the contact 11. When the switch is in its closed position, the current will pass on to the contact 10 and through the lower plate 3 and attached clamping means 18 to the conductor 19 soldered thereto. The conductor 19 serves as the ground connection for the battery thus completing the circuit as is shown in Fig. 5.

The flow of current having been established through the solenoid coil of the brake control device 21 and assuming that the vehicle is stopped on the level or an incline, pressure fluid will be prevented from returning to the master cylinder by the actuating brake control device 21 thereby holding the vehicle's brakes in applied position. Therefore, in order to release the vehicle's brakes it is necessary to deenergize the coil portion of the brake control device 21 thus permitting the return of entrapped fluid to the master cylinder. Consequently it is only necessary for the vehicle operator to apply a slight manual pressure to the accelerator pedal P and the switch assembly 1 mounted thereon to effect this release. As this slight pressure is applied the tongue or plate 2 (Figs. 2 and 4) is depressed downwardly whereby the insulation button 8 supported on tongue 2 by means of stud 7 contacts the switch member 12. Further downward movement causes the button 8 to deflect the switch member 12 downward whereupon the contact 11 carried by the member 12 is disengaged from the contact 10 thereby breaking the circuit at this point. Therefore, with the circuit broken, the electrically operated brake control device 21 is placed in its inoperative position permitting the release of entrapped fluid and the release of the brakes.

It should be observed that the actuation of the switch assembly to break or open the circuit is automatic on the part of the vehicle operator, since it is a natural reaction to depress the accelerator pedal in desiring to place the vehicle in motion. The brakes will by reason of the foregoing be automatically released and upon release of the accelerator pedal will place the circuit in condition for holding the brakes applied upon release of the brake pedal following depression thereof.

A modified form of the invention is shown in Figs. 6 through 9 wherein the tongue 2' is integral with the plate 2. The plate has two holes 2" drilled therein and the tongue cut from the plate. This tongue is preferably displaced above the plane of plate 2 to provide the necessary spacing between it and the base plate 3. The purpose of the holes 2" is to prevent metal fatigue at the hinge line of the tongue with the plate in order that it may flex with respect thereto. Since all other parts are the same as above they have the same reference numbers applied thereto. The operation of the modified form of this switch assembly is identical with that described above.

What I claim is:

1. A switch for association with the accelerator pedal of an automotive vehicle comprising a base plate, an upper plate secured to said base plate, a tongue cut from said upper plate and pivoted to the upper plate at one end thereof and spaced from the base plate, a bridging member secured to said base plate opposite the pivoted end of the tongue, a resilient element having one end thereof supported in said bridging member, a contact fixed to the other end of said resilient element, a contact fixed to the base plate and in alignment with the contact on the resilient element and normally in engagement therewith; and a member mounted on said tongue for contacting the resilient element and separating the contacts when the tongue is pivoted relative to said upper plate.

2. A control switch for association with an accelerator pedal, comprising a base plate having opposed ends; an upper plate connected to the base plate substantially coextensive therewith, said upper plate having a tongue struck therefrom and pivotally connected thereto adjacent one end and spaced from the base plate at the other end; a stationary contact mounted on the base plate adjacent said other end thereof; a resiliently mounted movable contact supported on the base plate adjacent said other end for normal engagement with the stationary contact; and means associated with the upper plate for opening the contacts responsive to the movement of the upper plate.

3. A control switch for association with an accelerator pedal, comprising a base plate having opposed ends; an upper plate pivotally connected to the base plate adjacent one end thereof; a stationary contact mounted on the base plate adjacent the other end thereof; a bracket removably fastened to the base plate adjacent said other end; a movable contact resiliently supported on said bracket for normal engagement with the stationary contact; and means supported on the upper plate and movable therewith for moving the movable contact away from the stationary contact.

4. A control switch for association with an accelerator pedal, comprising a base plate having opposed ends; an upper plate pivotally connected to the base plate adjacent one end thereof; a stationary contact mounted on the base plate adjacent the other end thereof; a bracket removably fastened to the base plate adjacent said other end; a resilient member supported within the bracket; a movable contact mounted on said resilient member for engagement with the stationary contact; and means carried by the upper plate and engageable with the resilient member for opening the contacts.

5. A control switch for association with an accelerator pedal, comprising a base plate having opposed ends and a top and a bottom; an upper plate pivotally connected to the top of the base plate adjacent one end thereof; a stationary contact mounted on the bottom of the base plate adjacent the other end thereof; a bracket removably fastened to the bottom of the base plate adjacent said other end; a spring-like member supported on the bracket and containing a movable contact mounted thereon; an aperture in the base plate in alignment with the spring-like member; and means supported on the upper plate and extending through said aperture for engagement with the spring-like member for opening the contacts when the upper plate is pivoted toward the base plate.

6. A control switch for association with an accelerator pedal, comprising a base plate having opposed ends and a top and a bottom; an upper plate pivotally connected to the top of the base plate adjacent one end thereof and having the other end movable toward and away from the base plate; an aperture in the base plate adjacent the other end thereof; a stud carried by the upper plate and extending through said aperture; means on the end of the stud preventing the removal thereof through the aperture so as to limit the movement of the upper plate away from the base plate; a stationary contact mounted on the base plate adjacent said other end; a bracket mounted on the base plate adjacent said other end and depending therefrom; a resilient member supported on said bracket in alignment with the stud; and a movable contact mounted on said resilient member and engageable with the stationary contact.

7. A control switch for association with an accelerator pedal, comprising a base plate having opposed ends; an upper plate pivotally connected to the base plate adjacent one end thereof; a stationary contact mounted on the base plate adjacent the other end thereof; a resiliently mounted movable contact supported on the base plate adjacent said other end for normal engagement with the stationary contact; means associated with the upper plate for opening the contacts responsive to the movement of the upper plate; and a transversely extending bendable clamping band fastened to the base plate adjacent said other end, said band being bendable about an accelerator pedal so as to hold the control switch in position thereon.

References Cited in the file of this patent

UNITED STATES PATENTS

| | | |
|---|---|---|
| 1,340,552 | Merrell | May 18, 1920 |
| 1,411,167 | Cutshall | Mar. 28, 1922 |
| 1,641,099 | Schuster et al. | Aug. 30, 1927 |
| 1,832,905 | Jacobson | Nov. 24, 1931 |
| 2,197,553 | Larson | Apr. 16, 1940 |
| 2,301,583 | Rodrick | Nov. 10, 1942 |
| 2,435,389 | Good | Feb. 3, 1948 |

FOREIGN PATENTS

| | | |
|---|---|---|
| 174,384 | Great Britain | Feb. 2, 1922 |
| 511,785 | Germany | Aug. 6, 1929 |